Nov. 5, 1935.    O. WEBER    2,019,589
AUTOMATIC FLUID FLOW REGULATOR
Filed Oct. 28, 1932
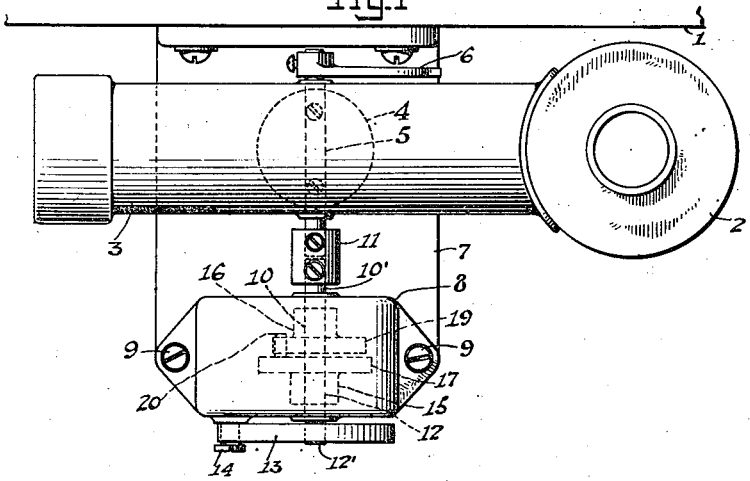
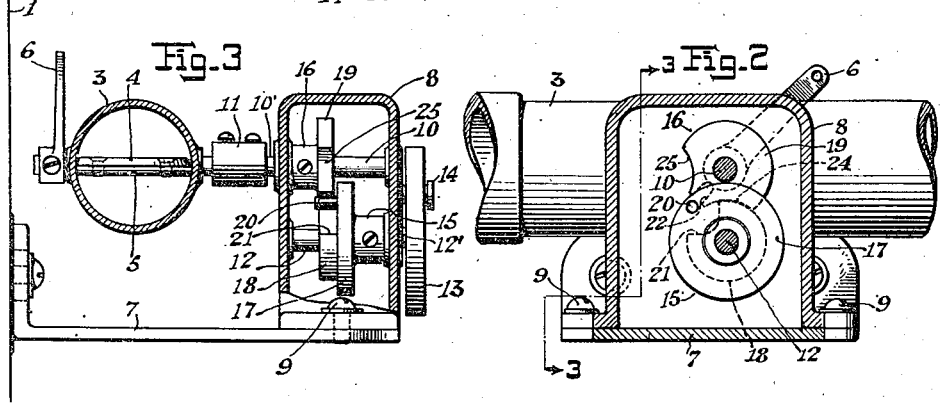
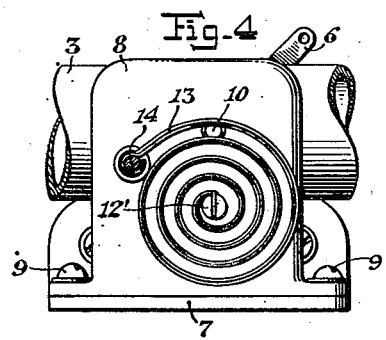
INVENTOR.
Otto Weber
BY William A. Hardy
ATTORNEY Patented Nov. 5, 1935

2,019,589

UNITED STATES PATENT OFFICE 2,019,589

AUTOMATIC FLUID FLOW REGULATOR

Otto Weber, West Orange, N. J.

Application October 28, 1932, Serial No. 639,967

12 Claims. (Cl. 236—101)

My invention relates to improvements in devices for automatically regulating the flow of liquids in conduits, and while adapted for other applications, is particularly designed for use in automatically controlling the flow of air through the air-intake conduit of the carburetor of an internal combustion engine in accordance with temperature conditions so as to insure supplying to the engine a fuel mixture of the proper degree of richness not only when starting the engine but also during the period the engine is warming up and after it reaches its normal operating temperature.

In its preferred embodiment my invention contemplates a construction wherein the position of a valve for controlling the flow of fluid through a conduit, as, for example, the ordinary butterfly choke valve in the air-intake of a carburetor, is regulated automatically by a thermo-sensitive device, such as a bi-metallic spring.

One of the objects of my invention is to provide an improved construction of this character wherein the bi-metallic spring or other thermo-sensitive device for regulating the position of the valve which controls the flow through the air-intake or other fluid conduit, will be subjected to no extraordinary stresses or strains when exposed to temperatures beyond those which are respectively effective to move the valve to its fully open and closed or other extreme positions.

Another object of my invention is to provide in a construction such as described, an improved arrangement whereby the thermo-sensitive device, upon expanding or contracting sufficiently to effect movement of the control valve to either of its extreme positions, is rendered free to partake of continued expansion or contraction without exerting any further action to actuate or move the valve.

A further object of my invention is to provide in a construction of this character, an improved actuating connection between the valve and the thermo-sensitive device which is operative to transmit from said device a force tending to move the valve only to points within a predetermined path of movement having the fully open and closed positions of the valve, or other prescribed extreme positions thereof, as limits.

Still another object of my invention is to provide a construction of the character described wherein the valve after being moved to either of its extreme positions by reason of the expansion or contraction of the thermo-sensitive device, is effectively locked in such position during any period when the degree of expansion or contraction of said device may be beyond that which was necessary to effect the movement of the valve to such extreme position.

Other objects and features of my invention will appear from the following description when read in connection with the accompanying drawing, and the appended claims.

In the drawing:

Figure 1 is a plan view showing a preferred embodiment of my invention as applied to the air-intake conduit of the carburetor of an internal combustion engine;

Fig. 2 is a front elevation, partly in section and partly broken away, of the structure shown in Fig. 1;

Fig. 3 is a part sectional view taken on line 3—3 of Fig. 2; and

Fig. 4 is a front elevation, partly broken away, of the structure shown in Fig. 1.

Referring to the drawing, 1 represents the cylinder block or frame of an internal combustion engine, 2 the carburetor of the engine and 3 the air-intake conduit of the carburetor in which is disposed the usual butterfly choke valve 4. The valve 4 is secured to a horizontal rotary shaft 5 which is journaled in the walls of the conduit 3 at diametrically opposite points with its end portions extending outwardly of the conduit. A crank arm 6 is secured to one end portion of the shaft 5 and is designed to be connected to a valve movably mounted in the exhaust pipe of the engine so as to regulate the position of such valve and thereby control the flow of the hot gases through said pipe.

The device for regulating the position of valve 4 to thereby control the flow of air through conduit 3 in accordance with temperature conditions, is supported on a horizontal bracket 7. This bracket is fixedly secured at one end, as by screws, to the engine frame 1, and a substantially rectangular casing 8 is fastened, by screws 9, to the bracket adjacent its other end. A horizontal shaft 10 aligned with the shaft 5, is journaled in the front and rear walls of casing 8 and has an end portion 10' which extends from the rear of the casing and which is connected by a suitable coupling 11 to the end portion of shaft 5 opposite that to which the crank arm 6 is secured. Another horizontal shaft 12 disposed vertically below and parallel to the shaft 10, is also journaled in the front and rear walls of casing 8 and has an end portion 12' which extends outwardly from the front of said casing. Reference character 13 represents a thermo-sensitive device shown as a bi-metallic flat spiral spring, which is disposed outwardly of the casing 8 adjacent the front wall thereof. The outer end of the spring 13 is attached to a stud 14 fixed to the casing 8 and the inner end thereof is fixedly secured within a slot provided in the end portion 12' of shaft 12. An actuating or driving connection is provided between the shafts 12 and 10, such connection preferably being or including a device which resembles or is in the nature of a Geneva mechanism and which may be accurately described and is hereinafter referred to as a mutilated Geneva gearing. This device comprises driving and driven members 15 and 16 respectively suitably secured to the shafts 12 and 10; the member 15 having a cylindrical portion 17 concentric with shaft 12 and a reduced cylindrical portion 18, and the member 16 having a generally cylindrical portion 19 which is vertically aligned with and is adapted to coact with the cylindrical portion 18 as will be hereinafter explained. A horizontal pin 20 is secured at one end to the portion 17 of member 15 at a point which is located a slight distance radially outward of the reduced portion 18 and directly opposite a recess or cut-away portion 21 provided in the latter portion. The pin 20 extends laterally from the portion 17 over the reduced portion 18 and is adapted to engage and coact with a radial slot 22 provided in the portion 19 of member 16. The said portion 19 is also provided on its edge adjacent to and at opposite sides of the slot 22, with similar concave cam surface portions 24 and 25 which have the same curvature as the greater part of the edge of the reduced portion 18 of member 15 and which, in different angular positions of member 16, respectively lie closely adjacent to and coact with the cylindrical edge of said reduced portion 18.

The spiral bi-metallic spring 13 is so constructed that it expands and tends to straighten out as the temperature to which it is exposed increases, and contracts and tends to coil up when such temperature decreases. In thus expanding and contracting, the spring 13, as is obvious, will turn the shaft 12 and thereby the driving member 15 of the mutilated Geneva gearing in one direction or the other. If the driving and driven members 15 and 16 of the mutilated Geneva gearing are then in operative angular driving relation, the member 16 will be turned by the coaction of pin 20 with slot 22 to thereby turn shaft 5 and effect opening or closing movement of the valve 4. The design and arrangement are such that the valve 4 will be thus moved to fully closed and fully open positions respectively at predetermined minimum and maximum temperature limits. Such minimum limit is preferably chosen as the highest temperature at which it is necessary in order to easily and most effectively start the engine, that the latter be supplied with the very rich fuel mixture which is obtained upon fully closing the choke valve 4; while the said maximum limit is generally the normal or most effective operating temperature of the engine, at which a comparatively "lean" fuel mixture should be supplied. The construction and relative arrangement of the mutilated Geneva gearing and associated elements are also such that the pin 20 will be operatively disengaged from the slot 22 in the driven member 16 just as the valve 4 reaches either its fully open or fully closed position in the movement thereof, as described, under the action of the spring 13 in expanding or contracting. When pin 20 is so disengaged from slot 22 one or the other of the cam surfaces 24 and 25, depending on whether valve 4 is in fully open or closed position, will be positioned closely adjacent the correspondingly curved cylindrical edge of portion 19 of the driven member 16 and will coact therewith to lock the valve in said position while permitting further or continued free expansion or contraction of the spring 13, in case the latter is subjected to temperatures beyond the limits referred to, without said spring being subjected to any such extraordinary stresses or strains as it would be if the operative driving connection between the same and the valve were constantly maintained, as has heretofore been customary. The drawing, particularly Fig. 2, shows the relative position of the parts of the mutilated Geneva gearing when the choke valve is in its fully open position. It is understood, of course, that the pin 20 is operatively engaged with slot 22 whenever the valve 4 is positioned anywhere between the limits of its opening and closing movements, and that the recess 21 in portion 18 of member 15 accommodates that part of member 16 wherein slot 22 is formed during the operation of the mutilated Geneva gearing in effecting opening and closing movements of valve 4.

It is to be understood that the construction shown and specifically described herein, while constituting a preferred embodiment of my invention, is merely illustrative, and that the same is subject to many modifications without departure from the spirit of my invention or the scope of the appended claims.

Having now fully described my invention, I claim:

1. In combination, a conduit, a movable valve associated with said conduit for controlling the passage of fluid therethrough, and means for moving said valve comprising a thermo-sensitive device and a wholly mechanical driving and controlling connection between such device and the valve, said device being effective through said connection automatically and positively to impart movement to said valve in each of two opposite directions, and said connection including means which automatically render said device ineffective to exert any force on the valve tending to move the same in a given direction and which also act to lock the valve against further movement in said direction, when the valve has been moved in such direction to a predetermined position.

2. In combination, a conduit, a valve associated with said conduit and movable between two predetermined limits to control the flow of fluid through the conduit, and means for moving said valve comprising a thermo-sensitive device and a wholly mechanical driving and controlling connection between said device and the valve, said device being effective through said connection automatically and positively to impart movement to said valve in each of two opposite directions, and said connection including means which automatically render said device ineffective to exert any force on the valve tending to move the same beyond one of said limits and which also act to lock the valve against movement beyond said limit, upon the valve being moved to such limit.

3. In combination, a conduit, a valve associated with said conduit and movable to control the flow of fluid through the conduit, and means for moving said valve comprising a thermo-sensitive device and a wholly mechanical driving and controlling connection between said device and the valve, said device being effective through said connection positively to impart movement to said valve in each of two opposite directions, and said connection including a mutilated Geneva gearing having means rendered effective to lock the valve against further movement in at least one of said directions when the valve has been moved in such direction to a predetermined point.

4. In combination, a conduit, a valve mounted in said conduit for turning movement, and means for turning said valve to regulate the flow of fluid through the conduit, said means comprising a bi-metallic coiled spring fixed at one end and a wholly mechanical driving and controlling connection including a mutilated Geneva gearing between the other end of the spring and the valve, said spring being effective through said connection to impart movement to said valve in each of two opposite directions, and said Geneva gearing having means which when the valve has been so moved to a predetermined point in either one of said directions are effective to lock the valve against further movement in such direction.

5. In combination, a conduit, a valve in said conduit movable to open and closed positions, a device which is expansible and contractable under temperature changes, means for moving the valve to said positions and positively actuatable by the force exerted by said device in expanding and contracting respectively, said means upon moving the valve to one of said positions under the action of said device in expanding being rendered ineffective to exert any action tending to move the valve when said device is further expanded, and means acting to lock the valve in said position whenever said device is in such a further expanded condition.

6. In combination, a conduit, a valve in said conduit movable to open and closed positions, a device which is expansible and contractable under temperature changes, means for moving the valve to said positions and positively actuatable by the force exerted by said device in expanding and contracting respectively, said means upon moving the valve to one of said positions under the action of said device in contracting being rendered ineffective to exert any action tending to move the valve when said device is further contracted, and means acting to lock the valve in said position whenever said device is in such a further contracted condition.

7. In combination, a conduit, a valve mounted in said conduit for pivotal movement in opposite directions to open and closed positions, and means for so moving said valve comprising a thermo-sensitive device consisting of a bi-metallic spring and a wholly mechanical driving connection between said device and said valve which is effective to transmit from said spring an actuating force effective to move the valve in each of said directions but only to points located within a path having as its limits the open and closed position of the valve, said connection including means adapted positively to lock the valve against movement to points beyond said limits.

8. In combination, a conduit, a valve mounted in said conduit for pivotal movement in opposite directions to open and closed positions, means for so moving said valve comprising a thermo-sensitive device consisting of a bi-metallic spring and a wholly mechanical driving connection between said device and said valve which is effective to transmit from said spring an actuating force effective positively to move the valve in each of said directions but only to points located within a path having as its limits the open and closed positions of the valve, and means for locking said valve in either its open or closed position whenever said spring is in a state of deformation beyond that required to effect the movement of the valve to such position.

9. In combination, a conduit, a valve movable to control the flow of fluid through said conduit, and means for actuating and controlling said valve comprising a thermo-sensitive device and members respectively fixedly connected with said valve and said thermo-sensitive device, said members being cooperative parts of a mutilated Geneva gearing and having cooperative means which when the valve is moved a predetermined amount in one direction, coact positively to lock the valve against further movement in such direction.

10. In combination, a conduit, a valve movable to control the flow of fluid through said conduit, and means for actuating and controlling said valve comprising a bi-metallic device and members respectively fixedly connected with said valve and said bi-metallic device, said members being cooperative parts of a mutilated Geneva gearing and having cooperative means which when the valve is moved a predetermined amount in one direction, coact positively to lock the valve against further movement in such direction.

11. In combination, a conduit, a valve movable to control the flow of fluid through said conduit, and means for moving said valve in opposite directions comprising a thermo-sensitive device and a connection between said device and the valve, said connection including cooperative driving and locking rotative members, one of said members having a single slot and concave surface portions at opposite sides respectively of said slot, and the other of said members having a pin adapted to coact with said slot and a curved surface portion adapted to coact with said concave surface portions.

12. In combination, a conduit, a valve mounted for turning movement to control the flow of fluid through said conduit, and means for actuating and controlling said valve comprising a bi-metallic coiled element and the cooperative driving and locking rotative members of a mutilated Geneva gearing, said coiled element being fixed at one end, one of said members being connected to the other end of said coiled element in fixed relation thereto, and the other of said members being connected to said valve in fixed relation thereto.

OTTO WEBER.